United States Patent
Laine

(10) Patent No.: US 12,225,496 B2
(45) Date of Patent: Feb. 11, 2025

(54) POSITIONING NETWORK OF TRANSMISSION RECEPTION DEVICES AND METHOD FOR INSTALLING TRANSMISSION RECEPTION DEVICES

(71) Applicant: Be Spoon, Le Bourget du Lac (FR)

(72) Inventor: Franck Laine, Le Balme de Sillingy (FR)

(73) Assignee: Be Spoon, Le Bourget du Lac (FR)

( * ) Notice: Subject to any disclaimer, the term of this patent is extended or adjusted under 35 U.S.C. 154(b) by 449 days.

(21) Appl. No.: 17/608,516

(22) PCT Filed: May 13, 2020

(86) PCT No.: PCT/EP2020/063380
§ 371 (c)(1),
(2) Date: Nov. 3, 2021

(87) PCT Pub. No.: WO2020/229561
PCT Pub. Date: Nov. 19, 2020

(65) Prior Publication Data
US 2022/0225268 A1   Jul. 14, 2022

(30) Foreign Application Priority Data
May 14, 2019 (EP) .................................. 19315033

(51) Int. Cl.
*H04W 64/00* (2009.01)
*H04W 4/33* (2018.01)

(52) U.S. Cl.
CPC ............. *H04W 64/00* (2013.01); *H04W 4/33* (2018.02)

(58) Field of Classification Search
CPC ......... H04W 4/33; H04W 4/18; H04W 64/00; H04W 4/027; H04W 4/029; G01C 21/206; H01R 4/2404
See application file for complete search history.

(56) References Cited

U.S. PATENT DOCUMENTS

| | | | |
|---|---|---|---|
| 9,634,858 B2 * | 4/2017 | Reller | H04L 12/40045 |
| 10,950,075 B2 * | 3/2021 | Colling | H01R 13/70 |
| 11,502,461 B1 * | 11/2022 | King | H02G 3/10 |
| 11,838,060 B2 * | 12/2023 | Goergen | G02B 6/4293 |
| 2015/0356332 A1 | 12/2015 | Turner et al. | |

(Continued)

*Primary Examiner* — Khawar Iqbal
(74) *Attorney, Agent, or Firm* — Slater Matsil, LLP

(57) ABSTRACT

A network of transmission reception devices can be used for an indoor location system covering an indoor environment. The network includes a power supply system and a number of transmission reception devices. The power supply system includes a power cable with a power line and a power source configured to supply a voltage to the power line of the power cable. The power cable is arranged in the indoor environment. The transmission reception devices each include a transmission reception unit configured to operate as a stationary unit of the indoor location system and a power receiving unit including a connector configured to mechanically connect the transmission reception device to the power cable and to electrically connect the transmission reception unit to the power line for powering the transmission reception unit. Each transmission reception device is connected to the power cable at a respective stationary position.

23 Claims, 4 Drawing Sheets

(56) References Cited

U.S. PATENT DOCUMENTS

| | | | |
|---|---|---|---|
| 2015/0382436 A1* | 12/2015 | Kelly | H05B 47/19 |
| | | | 315/131 |
| 2016/0088421 A1* | 3/2016 | Warner | H04W 4/029 |
| | | | 455/41.2 |
| 2016/0100289 A1 | 4/2016 | Mayorchik et al. | |
| 2018/0098201 A1 | 4/2018 | Torello et al. | |
| 2018/0114434 A1* | 4/2018 | Newman, Jr. | H05B 47/105 |
| 2018/0182387 A1* | 6/2018 | Chua | H04R 1/406 |
| 2019/0052524 A1* | 2/2019 | Kim | H04W 4/70 |
| 2019/0089467 A1* | 3/2019 | Goergen | H04L 12/40045 |
| 2020/0218235 A1* | 7/2020 | Kiefer | G01S 5/021 |
| 2020/0257872 A1* | 8/2020 | Torello | H04W 4/023 |
| 2022/0038189 A1* | 2/2022 | Goergen | H02J 50/80 |
| 2022/0210620 A1* | 6/2022 | Wahl | G01S 5/021 |
| 2023/0164373 A1* | 5/2023 | Rieger | H04N 21/433 |
| | | | 709/228 |

* cited by examiner

POSITIONING NETWORK OF TRANSMISSION RECEPTION DEVICES AND METHOD FOR INSTALLING TRANSMISSION RECEPTION DEVICES

CROSS-REFERENCE TO RELATED APPLICATIONS

This application is a national stage application of International Application No. PCT/EP2020/063380, filed on May 13, 2020, which claims priority to European Patent Application No. 19315033.1, filed on May 14, 2019, which applications are hereby incorporated herein by reference.

TECHNICAL FIELD

The present disclosure relates generally to a positioning network of transmission/reception devices and a method for installing transmission/reception devices.

BACKGROUND

Knowing the indoor position of an object or workpiece can be an essential functional requirement for applications such as smart factories, industrial or commercial storage handling, or motion detection of physical gestures. For this purpose, indoor location systems are developed that provide position information with an accuracy up to 10 centimeters or even in the centimeter range.

Indoor location systems usually are based on stationary units (herein also referred to as stationary transmission reception devices) and mobile units (herein also referred to as tags or tag devices). While the position of stationary units is known to the location system as a preset fixed (reference) position, mobile units are usually mobile and can be moved or move, thereby changing their position.

For example, US 2016/0100289 A1 discloses a localization and tracking system for determining the positions of mobile wireless devices using inter alia an ultra-wideband (UWB) technology. US 2015/0356332 A1 discloses, for example, motion sensors based on UWB technology for performance analysis in sports.

UWB-based location systems can obtain a position of a mobile unit, for example, by calculating differences in arrival times of signals communicated between several stationary units and the mobile unit.

Setting up a location system includes the installation of the infrastructure, specifically the installation of the stationary units. Significant activity and expenses are linked to setting up the infrastructure. Usually electricians are required to connect the large number of stationary units to the power net. In addition, the stationary units may be integrated into a data network for information exchange. Stationary units usually are installed at some height well above ground such as below the ceiling. This ensures a required range for the signal exchange with the mobile unit to be localized over the localization range of the location system.

SUMMARY

The present disclosure relates generally to indoor location systems. Moreover, the present disclosure relates generally to a positioning network of transmission reception devices of such an indoor location system, and specifically implementing the same in a hall providing an indoor environment. Furthermore, the present disclosure relates to a method for installing a plurality of transmission reception devices of an indoor location system in an indoor environment of a hall, for example.

Embodiments can improve or overcome one or more aspects of prior systems. For example, embodiments can be directed to simplifying the installation of the stationary units, thereby reducing the involved processes and expenses.

In an aspect, the present disclosure is directed to a positioning network of transmission reception devices of an indoor location system covering an indoor environment, the positioning network. The positioning network includes a power supply system including a power cable with at least one power line, wherein the power cable is arranged in the indoor environment. The positioning network includes further a power source configured to supply a voltage to the power line of the power cable, and a plurality of transmission reception devices. Each transmission reception device includes a transmission reception unit and a power receiving unit. The transmission reception unit is configured to operate as a stationary unit of the indoor location system for localizing a mobile unit, and the power receiving unit includes a connector that is configured to mechanically connect the transmission reception device to the power cable and to electrically connect the transmission reception unit to the power line for powering the transmission reception unit. Furthermore, each transmission reception device of the plurality of transmission reception devices is connected to the power cable at a respective stationary position.

In some embodiments, the (predetermined) stationary positions form an infrastructure of transmission reception units in a garland arrangement to allow localization of a mobile unit of the indoor location system.

In some embodiments, at least one of the connectors includes a conductor electrically connected to the transmission reception unit, and electrically contacting the power line.

In some embodiments, the at least one power line of the power cable is embedded in an insulator and at least one of the connectors includes a conductor extending through the insulator for electrically contacting the power line.

In some embodiments, the power cable may include an insulator and the at least one power line of the power cable is embedded in the insulator. At least one of the connectors may include a conductor electrically connected to the transmission reception unit, extending through the insulator, and electrically contacting the power line.

In some embodiments, the positioning network further includes a support structure, wherein the power cable is fixed to the support structure at a plurality of fixation points such that the cable passes across the stationary positions. Alternatively or additionally, the positioning network further includes a support wire arrangement including at least one wire segment extending within the indoor environment, wherein the power cable is fixed to the wire segment at a plurality of fixation points such that the power cable passes along the stationary positions.

In some embodiments of the positioning network, the power cable is configured as a profiled cable and includes two power lines such as internal copper strands embedded in an insulator of the power cable. The connector of the power receiving unit includes a pair of piercing needles enabling penetration of the insulator and displacing the power lines without cutting but contacting the power lines. The power cable may optionally be configured as an actuator-sensor-interface flat cable including, and the connector of the power receiving unit may be configured as an actuator-sensorinterface connector including a pair of piercing needles enabling a cable piercing technology for the actuator-sensor-interface flat cable.

In some embodiments of the positioning network, at least one transmission reception unit includes a circuit board electronics with a radio pulse wave generator and receiver configured to perform ultra-wideband radio transmission and reception for large bandwidth communication. The large bandwidth communication may use a bandwidth of at least 500 MHz or of at least 20% of a carrier frequency. The carrier frequency may be and thus the large bandwidth communication may take place in a frequency band of 3.1 GHz to 10.6 GHz such as at 4 GHz or 8 GHz. The large bandwidth communication may have an equivalent isotropically radiated power density of less than or equal to 41.3 dBm/MHz.

Another aspect of the present disclosure relates to a hall providing an indoor environment. The hall includes a support wire arrangement, in particular with at least one wire segment, extending within the indoor environment above a floor of the hall. The hall may further include a positioning network as described above. The positioning network has a power supply system including a power cable with at least one power line, optionally embedded in an insulator, wherein the power cable is arranged in a network configuration within the indoor environment. The positioning network also has a power source configured to supply a voltage to the power line of the power cable. The positioning network includes further a plurality of transmission reception devices. Each transmission reception device includes a transmission reception unit and a power receiving unit. The transmission reception unit is configured to operate as a stationary unit of the indoor location system, and the power receiving unit includes a connector configured to mechanically connect the transmission reception device to the power cable and to electrically connect the transmission reception unit to the power line, optionally through the insulator, for powering the transmission reception unit. Thereby, the power cable is fixed to the support wire arrangement at a plurality of fixation points and the plurality of transmission reception devices is connected to the power cable at respective stationary positions. In addition or alternatively to the support wire arrangement, the hall may have a support structure to which one or more of the plurality of transmission reception devices are connected.

In some embodiments, the hall may include a plurality of storage and/or work stations such as shelving structures and/or machine tools and a plurality of aisles extending along or between storage station and/or work stations. Then, the at least one wire segment extends at least at a portion of an aisle of the plurality of aisles. For example, the hall further includes a plurality of aisles extending within the indoor environment between storage and/or work stations and linear wire sections extending at least at a portion of an aisle of the plurality of aisles. Optionally, an installation altitude of the at least one wire may be higher than a height of the storage and/or work stations.

Another aspect of the present disclosure relates to a method for installing a plurality of transmission reception devices of an indoor location system in an indoor environment, wherein each transmission reception device includes a transmission reception unit configured to operate as a stationary unit of the indoor location system, and a power receiving unit for powering the transmission reception unit. The method includes the steps of:
  identifying stationary positions in the indoor environment for operating the plurality of transmission reception devices to ensure localization of a mobile unit in at least preselected localization areas within the indoor environment;
  deriving at least one course of a power cable with at least one power line, which is optionally embedded in an insulator, wherein the identified stationary positions are arranged along the at least one course;
  deploying the power cable along the course; and
  fixing a respective one of the plurality of transmission reception devices at each stationary point by mechanically connecting a connector of the respective power receiving unit to the power cable and electrically connecting the transmission reception unit to the power line, in particular by piercing through the insulator.

In some embodiments, the method further includes installing a support wire arrangement with at least one wire within the indoor environment, and fixing the power cable to the wire at a plurality of fixation points such that the cable passes along the stationary positions.

In some embodiments, the method further comprises recording spatial positions of the plurality of transmission reception devices within the indoor environment to calibrate the location system.

Further embodiments of the above aspects, are disclosed in the dependent claims, which are incorporated herein by reference. Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION OF ILLUSTRATIVE EMBODIMENTS

Figure 1A:
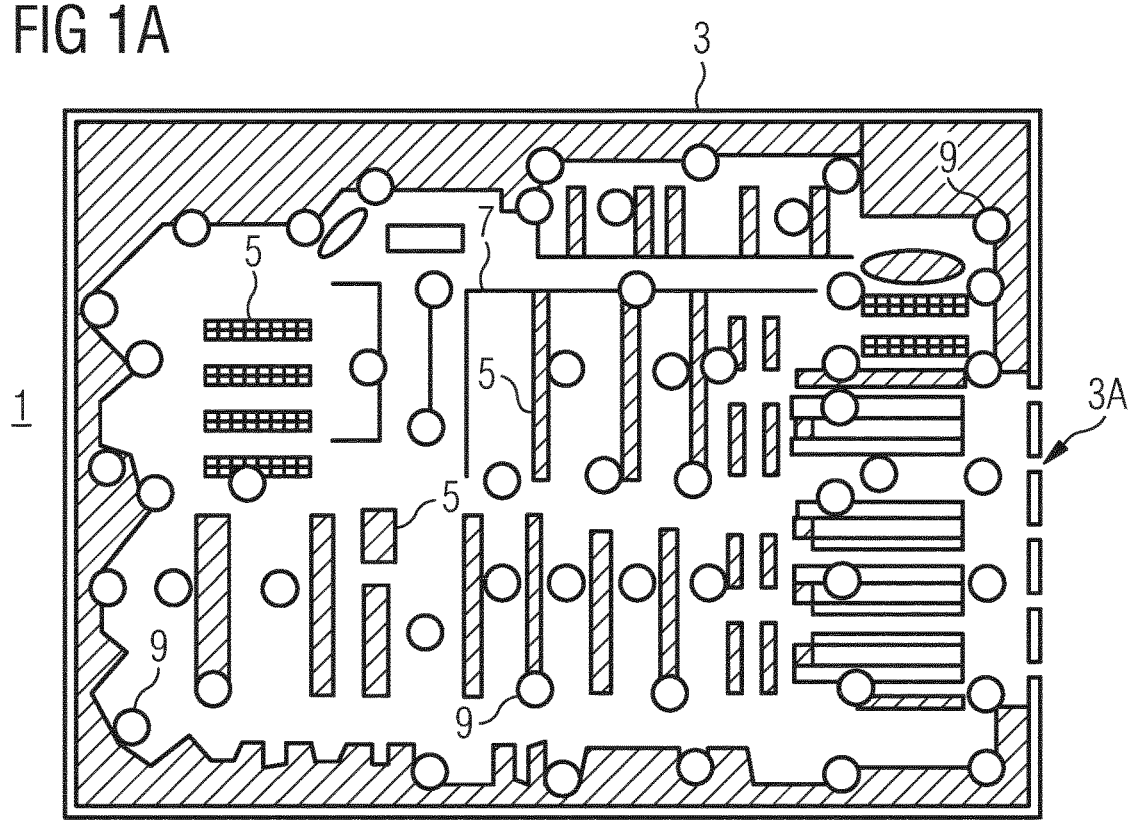
FIG. 1A is a schematic map of a hall such as a supermarket hall.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that location systems can be based on a simplified installation of stationary units. Specifically, the location system can use transmission reception devices as stationary units that are mounted in a network-type manner (i.e., distributed over an area). Usually, the transmission reception devices are positioned at a given altitude above the area to be covered by the location system. Herein, such an installation of transmission reception devices and their associated power supply system is referred to as a positioning network. The positioning network may be formed like a (e.g., meandering) garland below the ceiling of a large hall which is subject to the location system. Alternatively, the positioning network may be formed to build lines of a grid along which the transmission reception devices are set at desired positions.

Generally, the positioning network is configured to supply power to the transmission reception devices that are distributed within an indoor environment such as a hall. It was acknowledged by the inventors that, if the transmission reception devices are of light weight and can be operated with low power consumption, a power cable can be laid out/installed to pass by any desired location at which a transmission reception device should be positioned. The power cable itself can be, for example, mounted to a support structure or a support wire arrangement. As will be understood by the skilled person, the power cable does not need to be configured to carry large weights as the structural requirements for the support of the power cable are fulfilled by the support structure or support wire arrangement. The lightweight transmission reception devices essentially do not add any weight to be considered.

In particular, the inventors realized that the stationary units can be based on tag-like, thus lightweight, transmission reception devices. Tag-like transmission reception devices can be used as stationary units in UWB location systems that employ smart mobile units to be localized. To localize a smart mobile unit by transmission reception procedures requires only simple activities to be performed by the transmission reception devices; i.e., the transmission reception devices receive UWB signals from the smart mobile unit and emit UWB signals based on some timing requirements. Any further tasks of the localizing procedure (such as time-of-flight determination of the UWB signals) is performed within the smart mobile unit or a central control system.

The location system may be configured as a real-time location system as described in more detail in PCT-application PCT/FR2019/000057 "ULTRA-WIDEBAND LOCATION SYSTEMS AND METHODS" with filing date 19 Apr. 2019 by the same applicant, the entire contents of which is incorporated herein by reference The herein described transmission reception devices (e.g., transmission reception devices 31 shown in FIG. 3) may be implemented as the beacon devices, anchors, or tag response receptor units described in the PCT application PCT/FR2019/000057. With the location rate frame format described in the PCT application PCT/FR2019/000057, the distances and the positions of all transmission reception devices may be easily determinable and the positioning network may be implemented very fast after physical installation.

While mobile tag devices (as those discussed in the PCT application PCT/FR2019/000057) may be battery powered, the herein disclosed transmission reception devices do not need to be battery-powered. Usually, the transmission reception devices do not have batteries, and thus do not require, e.g., a charging circuit and a charge indication LED. Instead, the herein disclosed transmission reception devices may include power transforming devices. Moreover, as the herein disclosed (tag-like) transmission reception devices are installed in stationary positions, they do not need any motion-detection circuits. In summary, the herein disclosed transmission reception devices can be of reduced weight in comparison with "mobile" tag devices, whereby the herein disclosed setup of a positioning network becomes in particular possible.

In an exemplary embodiment, a power cable (such as an electrical wire) has at least one power line embedded in an insulator. The power cable is deployed within a space that is to be covered by an indoor location system. For example, the power cable can be attached at multiple fixation points to a support structure (e.g., specific mounts installed generally for mounting cables and/or pipes below the ceiling). Alternatively, the power cable can be attached at wire segments of a support wire arrangement, which is specifically installed for mounting the power cable. The support structure or the support wire arrangement can be provided above the area to be covered by the location system.

The power cable itself is configured to provide power to the various transmission reception devices. Therefore, its power line is connected to a power source such as the main power line or a power transformer connected to the main power line. The power transformer is configured to provide, for example, a desired AC or DC voltage via the electrical wire to the transmission reception devices. The power cable is similarly adapted to supply modules, for example, with 24 V or 36 V DC AUX power. The connection of the electrical power line of the power cable needs to be done usually only once by an electrician, in contrast to an installation where each stationary unit is individually electrically connected to the main power line. Thus, the installation is simplified.

The transmission reception devices are connected to the power cable at desired spots/locations. Connecting a transmission reception device electrically to the power line can be a simple operation. For example, one may configure the transmission reception device as an actuator-sensor-interface (ASi) module. Then, one can use an ASi flat cable as power cable and respective ASi connectors as the connectors being part of the transmission reception devices. For ASi connectors, only simple screwing may be required for mechanically connecting the transmission reception device to the cable and electrically connecting the transmission reception device to the power line. This type of clip connections can make the installation of the transmission reception units to the power cable (held by the support structure/support wire arrangement) straightforward. Generally, various cable piercing technologies may be applied such as the standardized ASi concept. It is noted that the feature to be able to communicate via the ASi cable with the transmission reception devices is not needed for the purpose of pure power supply. In that sense, the ASi cable is an example of a component of a flexible cable connection system based on a profiled cable for which alternative configurations are known in the art.

Preferably, clipping and electrically connecting is performed freely along the length of the cable. However, in some embodiments also a sequence of pre-mounted holders to a cable may be used. The holders, for example, may be distributed along the power cable at even distance. The distance is selected such that the desired locations of the transmission reception devices can be essentially implemented within a hall. A holder, for example, may be configured to comprise thread into which a transmission reception unit is screwed.

Figure 2:
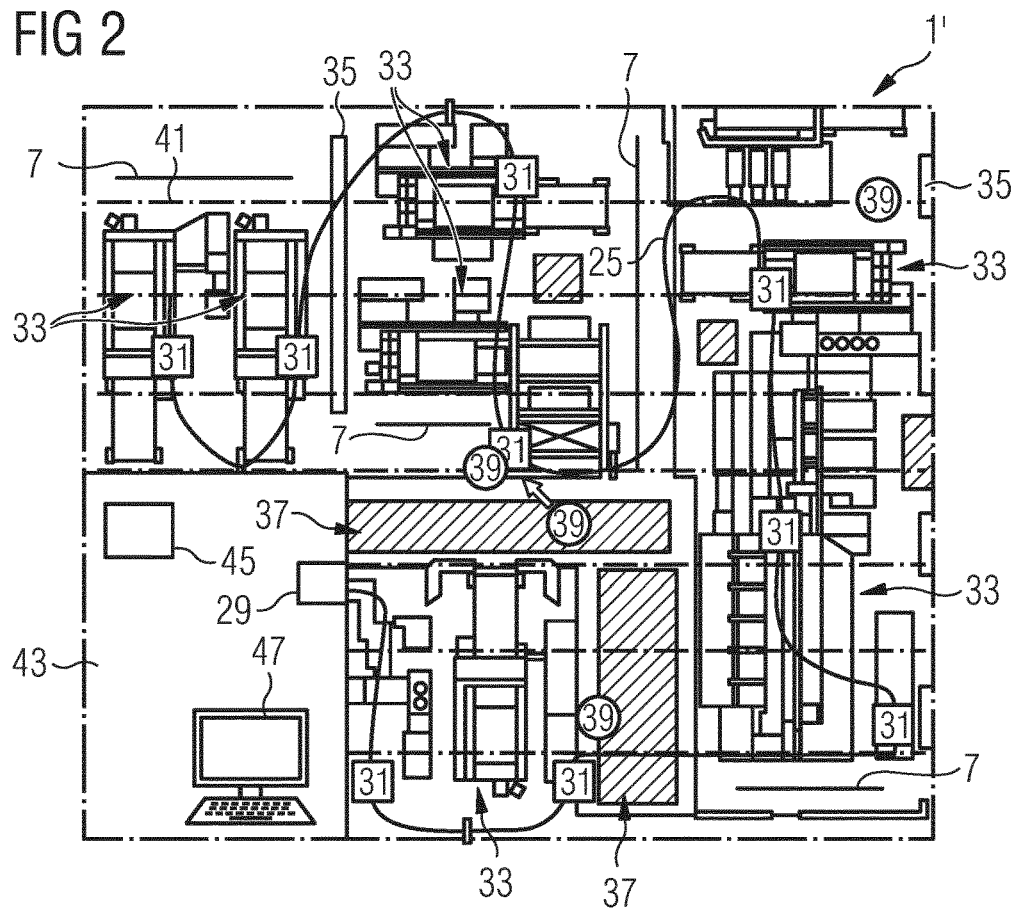
FIG. 2 is a schematic map of a factory with multiple storage and/or work stations and a positioning network of an indoor location system.
Figure 3:
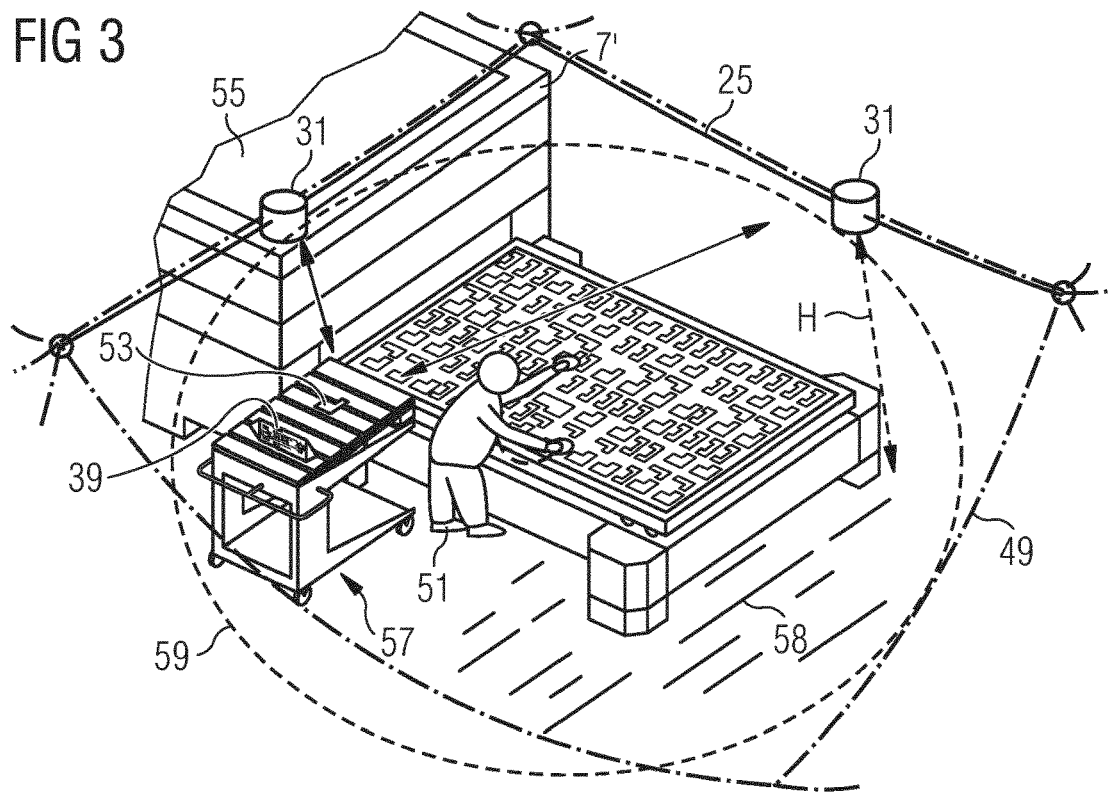
FIG. 3 is a schematic illustration of a work station of the factory of FIG. 2 covered by the indoor location system.
Figure 4A:
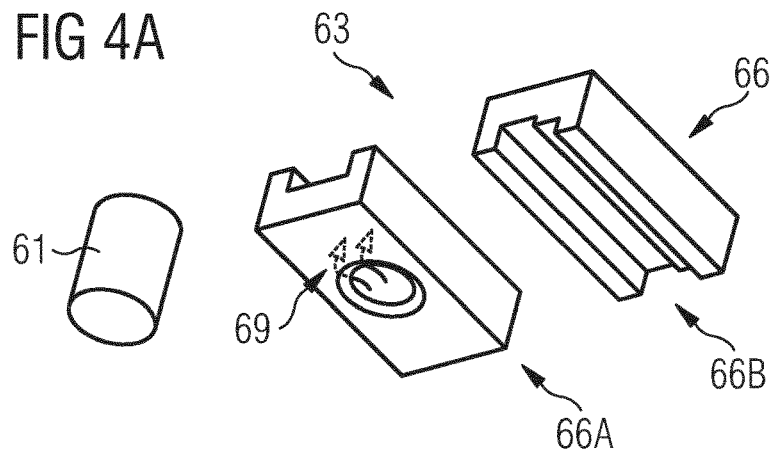
FIGS. 4A to 4C are schematic views of a transmission reception device illustrating the process of mounting the transmission reception device to a cable.
Figure 4B:
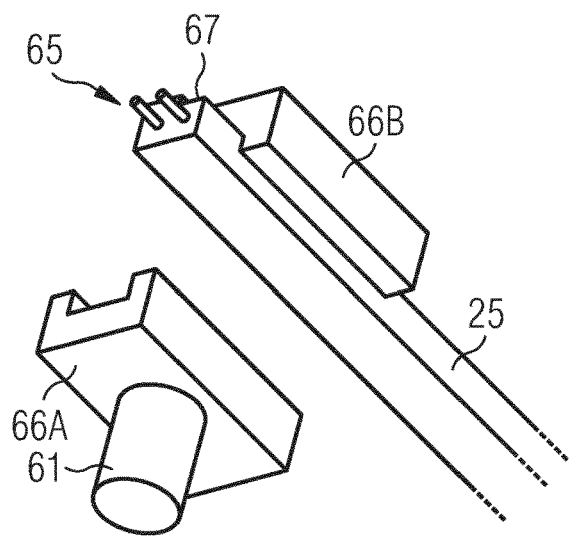
Figure 4C:
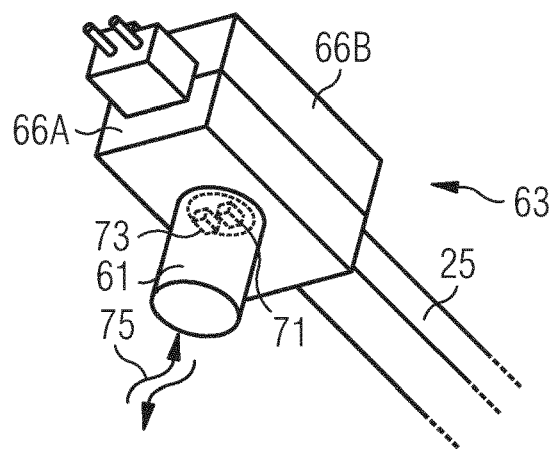

In the following, various embodiments of a positioning network and installation procedures are disclosed in connection with FIGS. 1A to 4C. Specifically, FIGS. 1A to 1D illustrate how positioning networks can be set up within a hall, for example, of a supermarket or production site/factory. FIG. 2 illustrates a positioning network for a factory with multiple work stations. FIG. 3 provides details for an exemplary work station covered by the indoor location system. FIGS. 4A to 4C illustrate the mounting of a transmission reception device to a power cable such as an ASi flat cable.

FIG. 1A illustrates a schematic map of a hall 1; exemplarily the hall 1 is a supermarket hall but similarly it could be also a commercial or industrial hall. The hall 1 is delimited by an outer wall 3. One can enter the hall 1 at an entrance/exit area 3A (indicated by a dashed line portion of wall 3). The entrance/exit area 3A may comprise cash decks for checking out and paying for the purchased products.

Within the hall 1, various shelving structures 5 are schematically shown. A shelving structure or a manufacturing site or machine tool (see FIG. 2) are examples of a storage station and/or a work station.

A customer will use, for example, a shopping cart for collecting various products pushing his cart along aisles between the shelving structures. The shopping cart may comprise a mobile unit for tracking the position of the shopping cart within the hall 1, thereby being able to provide information to the customer and collect information about the customer's activities. In addition to the shelving structures 5, delimiting partition walls 7 may limit the freedom of movement within the hall 1. (Note that not all shelving structures and walls are indicated with reference numerals for clarity in FIG. 1A.)

In FIG. 1A, dots indicate locations 9 that are preferred positions for installing a stationary unit of a location system. Exemplary preferred locations 9 are given along the shelves at the wall 3 as well as next to shelves within the hall 1. Positioning transmission reception devices at the preferred locations 9 will provide a desired coverage of the hall for localizing the mobile units with a desired precision. The locations can be selected/identified by tests, simulations, or previous experience and consider those positions/tracks of the mobile units that one can expect for a specific hall. The location may also depend, for example, on the height of the various structures within hall 1. As one can see, the preferred locations 9 of the transmission reception units are quite freely distributed in the hall 1. Thus, the locations are, for example, not aligned.

Figure 1B:
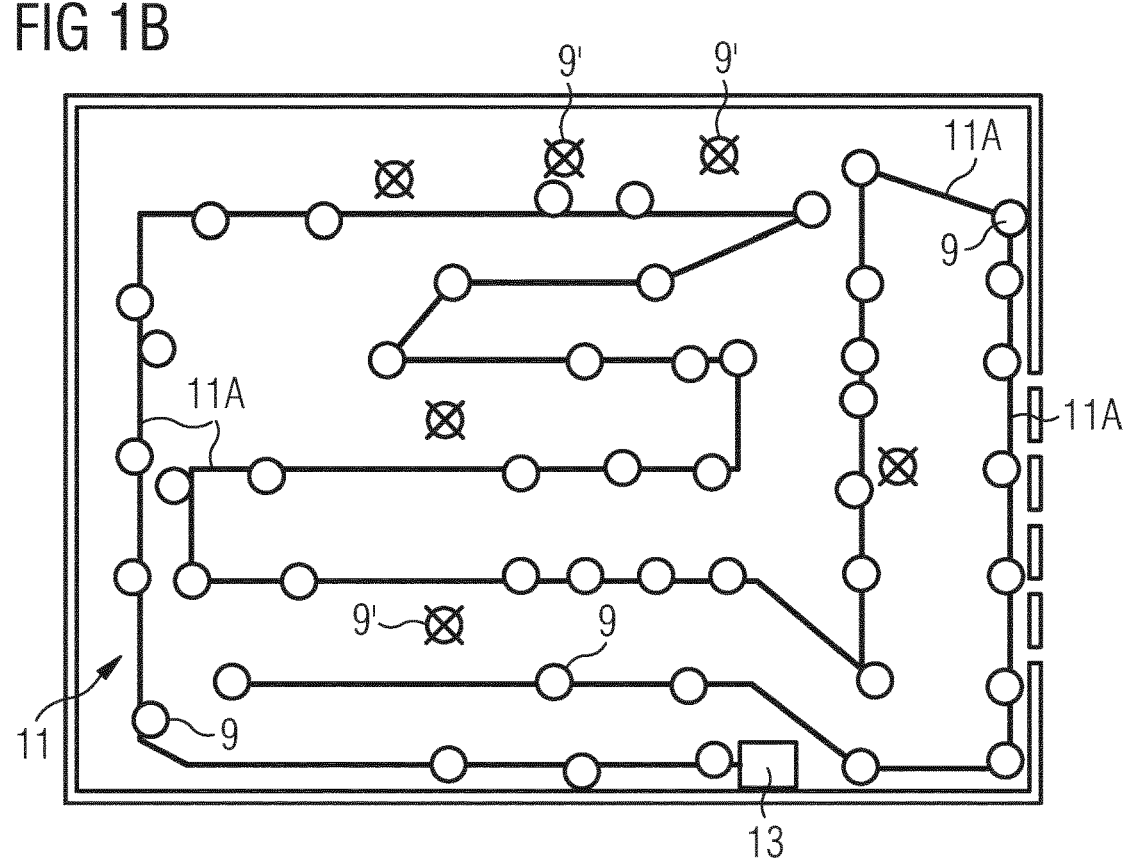
FIG. 1B is a layout of a first positioning network of an indoor location system for installation in the hall of FIG. 1.

FIG. 1B indicates schematically an exemplary layout of a first positioning network for the hall 1 of FIG. 1A. The positioning network comprises a power cable 11 that forms straight line cable segments 11A between fastening clips (attached, for example, to a ceiling and acting as support structure). The fastening clips represent an example of how one can install the power cable 11 to ensure that the power cable 11 passes along (by) the locations 9 of FIG. 1A. For that purpose the fastening clips may be positioned close to the locations 9. As one can see, to keep the network simple, several locations 9' are not covered by the positioning network. Locations 9' can be neglected if, for example, a reduced precision of the location system is acceptable in the respective section of the hall 1. At each location 9, a transmission reception device (not shown) is mounted to the power cable 11 to complete the positioning network (see also FIGS. 4A to 4C).

FIG. 1B shows further schematically a power source 13 for supplying power to the transmission reception devices. The power source 13 may be positioned at one end of the power cable 11 and is electrically connected to at least one power line of the power cable 11. Thereby, the power cable 11 can, for example, apply a required DC voltage to the transmission reception units mounted to the power cable 11 at the locations 9. Thus, a power supply system is set up for the transmission reception devices that includes the power cable 11 and the power source 13.

Figure 1C:
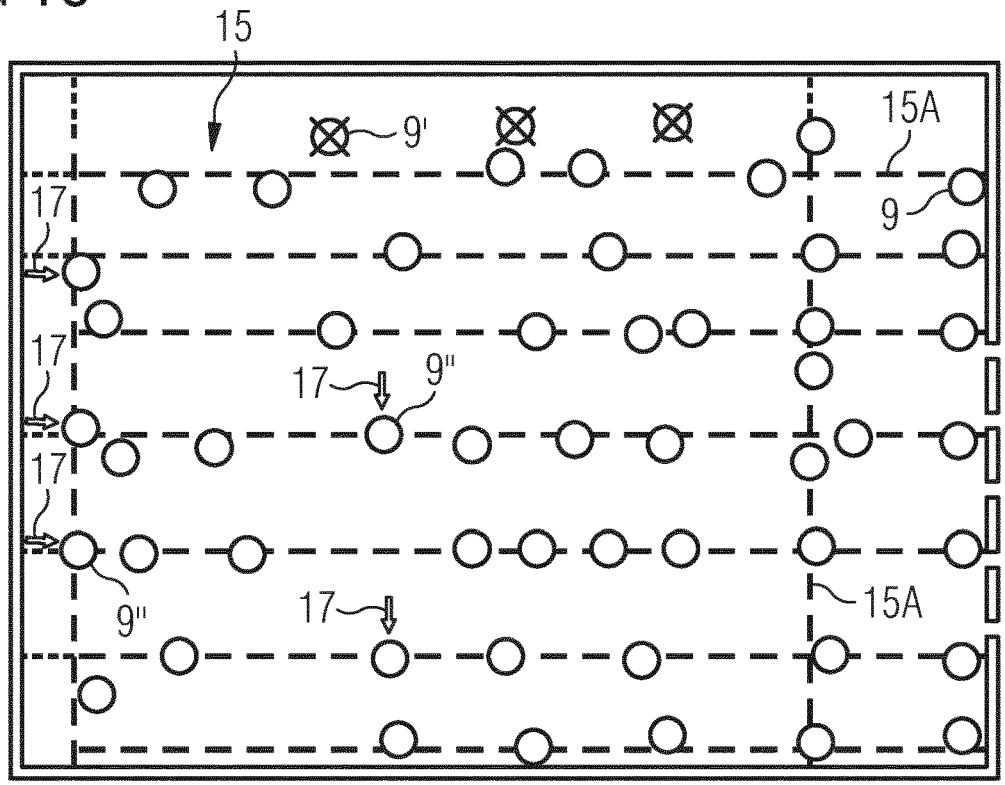
FIG. 1C is a schematic illustration for deriving a support structure for installation in the hall of FIG. 1.

FIG. 1C illustrates schematically an approach for deriving a configuration of a support wire arrangement intended to simplify the installation even for large halls with high ceilings. A support wire arrangement can be used to enable the positioning of the transmission reception units at those locations 9 within the hall 1 that were identified in FIG. 1A.

As exemplarily shown in FIG. 1C, a support wire arrangement 15 provides wires (wire segments 15A) mounted preferably along straight lines across the hall 1 such as along aisles. Usually, the wires would extend between opposing walls of the hall or suitably positioned columns in the hall. As a result, the support wire arrangement 15 extends in a grid-like manner. The wires pass through the locations 9 or run at least closely by the locations 9. Preferably, the support wire arrangement 15 extends at essentially a constant height above the floor of the hall, preferably even above the shelving structures 5. Then the transmission reception units would be essentially at that height as well. For example at a height that is higher than a height of a storage and/or work station. If an installation height of the transmission reception units is not preset, the installation height of each of the transmission reception devices can be measured later on, e.g., when activating the location system. To provide for stationary positions, i.e., positions that are fix in space, preferably robust wires (and/or bars, e.g., metal bars) can be used.

It will be acknowledged that a support structure (e.g., fastening clips) or a support wire arrangement can be installed without the help of an electrician as no electricity is involved at this stage.

If the support wire arrangement 15 is set up in the indicated manner, most of the locations 9 would lie (or could be moved by a small amount to lie) within a mounting range of the support wire arrangement 15. For some of the locations 9, a movement is schematically indicated by arrows 17 and the respectively moved locations are indicated with reference numeral 9'' in FIG. 1C. As further illustrated in FIG. 1C, at some of the locations 9, transmission reception units would not be installed as a respective movement of those locations onto the grid-like structure would, for example, not increase a performance to the location system. Respective non-used locations are indicated in FIG. 1C with reference numeral 9' (as in FIG. 1B).

Figure 1D:
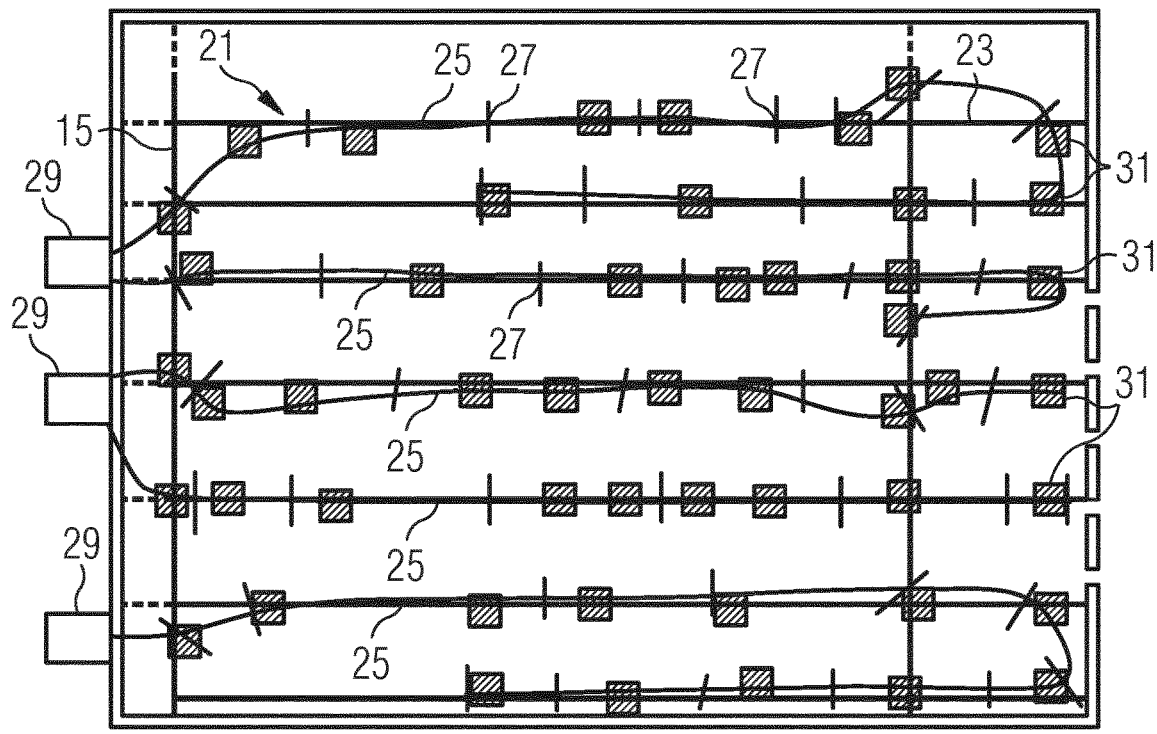
FIG. 1D is a layout of a second positioning network of an indoor location system for installation in the hall of FIG. 1 using the support structure illustrated in FIG. 1C.

Based on the support wire arrangement 15 of FIG. 1C, FIG. 1D shows a positioning network 21 comprising the support wire arrangement 15 extending in the discussed grid-like manner. The positioning network 21 further comprises a set of cables 25. The cables 25 are attached to the support wire arrangement 15 at multiple fixation points 27.

In addition, the positioning network 21 comprises several power sources 29 associated to respective cables 25. As schematically indicated in FIG. 1D, one power source 29 can be used in connection with one or more cables 25. The length of the cables 25 is limited by the range over which sufficient power can be provided to a transmission reception device 31 mounted at a far end of the power cable 25, specifically a transmission reception unit of the transmission reception device 31.

To complete the positioning network 21, a plurality of transmission reception devices 31 are mounted to the cables 25 at the locations 9 shown in FIG. 1C, i.e., at respective predetermined stationary positions. Each transmission reception device includes a transmission reception unit configured to operate as a stationary unit of the indoor location system for localizing a mobile unit. Each transmission reception device includes further a power receiving unit. The power receiving unit includes a connector configured to mechanically connect the transmission reception device 31 to the power cable 25 and to electrically connect the transmission reception unit to a power line of the power cable for powering the transmission reception unit.

FIG. 2 shows a section 1' of a hall of a factory in which an indoor location system is installed to track the position of, for example, workpieces, tools, transportation means, and workers. The factory comprises a plurality of manufacturing sites with machine tools 33. The manufacturing sites may be separated by wall portions 7 or shelving 35, and may be connected via walking areas 37.

As shown in FIG. 2, during operation of the smart factory, one would like to track the positions of various mobile units 39 of the indoor location system. For that purpose, the location system includes a plurality of transmission reception units 31 that are connected to a power cable 25. To have the power cable 25 pass by locations planned for transmission reception units 31, the power cable 25 is attached to a support structure 41 and/or walls at respective fixation points as schematically indicated by dashed dotted lines in FIG. 2. In the exemplary configuration, the power cable 25 extends in a meandering course through the hall. The power cable 25 is supplied with power from a power supply unit 29.

FIG. 2 indicates further schematically a control room 43. In the control room 43, a control system 45 is provided to analyze the detected position information of the various mobile units 39 and to present respective information to an operator, for example, on a screen 47 of the control unit 45.

FIG. 3 illustrates, the installation of transmission reception units 31 for an exemplary manufacturing site of a laser cutting machine 55. Exemplarily for supporting means of the cable, FIG. 3 shows a support wire arrangement 49 (dashed dotted line). The support wire arrangement 49 extends, for example, in a grid-like manner within the factory hall. A cell of the grid may be associated to the laser cutting machine 55. A power cable 25 is attached to and runs along two sides of a respective cell of the grid. Respective transmission reception devices 31 are attached to the power cable 25.

As further shown in FIG. 3, an operator 51 sorts (laser cut) workpieces 53 from an output area of the laser cutting machine 55 onto a transport wagon 57. On the wagon, a mobile tag device 39 is positioned such that sorted workpieces 53 can be followed, for example, when further production steps are performed at different machine tools/manufacturing sites.

The transmission reception units 31 are attached to the power cable 25 at specific locations and at defined heights H above a floor 58 of the factory. The transmission reception units 31 are positioned such that a specific area 59, in which the operator 51 is acting, is covered by the location system; i.e., mobile tag devices can be localized within the area 59 with a desired accuracy.

FIGS. 4A to 4C illustrate schematically a transmission reception device that can be mounted to an ASi flat cable. For localizing, for example, the mobile unit 39 of FIG. 3, a plurality of those transmission reception devices is needed to exchange signals such as UWB signals. Specifically, the transmission reception device includes a transmission reception unit 61. The transmission reception unit 61 is configured to be operated as a stationary unit of the indoor location system and performs signal generation, emission, and reception.

The transmission reception device further includes a power receiving unit 63. The power receiving unit 63 includes a connector 66. The connector 66 is configured to mechanically connect the transmission reception device to the power cable 25 and to electrically connect the transmission reception unit to a power line 65 embedded in an insulator 67 of the power cable 25. The connector exemplarily shown in FIG. 4A comprises two parts 66A and 66B between which a cable can be clipped.

As exemplarily shown in FIG. 4B, the power cable 25 may be configured as an actuator-sensor-interface (ASi) flat cable including two power lines such as internal copper strands embedded in an insulator with a defined outer shape.

The connector 66 shown in FIG. 4A is accordingly also configured as an actuator-sensor-interface connector. Alternative cable configurations can be used that preferably by clipping allow a mechanical and electrical connection. For example, a connector (or a part of the connector) may include a pair of piercing needles 69 enabling penetration of the insulator 67 and to displace the power lines 65 without cutting the same, but while electrically connecting the same. Thus, the piercing needle is an example of a conductor that, in the mounted state of the transmission reception device, is electrically connected to the transmission reception unit 61 and extends through the insulator 67 to electrically contact the power line 65.

As further shown in FIG. 4B, the transmission reception unit 61 can be attached to one of the parts 66A of the connector 66. For example, the transmission reception unit 61 can be attached permanently or removably. The attachment can be based on a screwing connection like a light bulb holder.

FIG. 4C illustrates the mounted state of the transmission reception device. The parts 66A, 66B of the connector 66 are tightly attached to each other (e.g., screwed or clipped together), such that the power cable 25 is clamped in between the parts 66A, 66B. In the mounted state, the transmission reception unit 61 is electrically connect to the power line 65 for powering the transmission reception unit 61.

As will be understood, a power cable can be pre-mounted with multiple connectors that are attached to the power cable and are electrically connected to the power line 65. The connectors may be connectors as described in connection with FIGS. 4A to 4C but alternatively could also be configured as electrical holders structurally integrated at preset distances into the power cable as known, e.g., from light chains.

By the electrical connection via the piercing needles 69, a circuit board electronics 71 (schematically shown in FIG. 4C in dashed line), as well as a radio pulse wave generator and receiver 73 are electrically connected to the power line 65. Thereby, ultra-wideband communication (indicated by arrows 75 in FIG. 4C) between the transmission reception device and the mobile unit is possible for performing localizing of the mobile unit within an indoor environment. For example, the radio pulse wave generator and receiver is configured to perform large bandwidth communication with a bandwidth of at least 500 MHz or of at least 20% of a carrier frequency. The carrier frequency may be in particular in a frequency band from 3.1 GHz to 10.6 GHz. Exemplary carrier frequencies may be at 4 GHz or 8 GHz. The radio pulse wave generator and receiver may emit an equivalent isotropically radiated power density of less than or equal to 41.3 dBm/MHz.

Although the preferred embodiments of this invention have been described herein, improvements and modifications may be incorporated without departing from the scope of the following claims.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A network of ultra-wideband transmission reception devices for an indoor location system covering an indoor environment, the network comprising:
    a power supply system comprising:
        a power cable configured as an actuator-sensor-interface (ASi) flat cable with a power line, wherein the power cable is arranged in the indoor environment, and
        a power source configured to supply a voltage to the power line of the power cable; and
    a plurality of ultra-wideband transmission reception devices, each ultra-wideband transmission reception device configured to communicate via ultra-wideband with one or more mobile units within its range, each ultra-wideband transmission reception device comprising:
        an ultra-wideband transmission reception unit configured to operate as a stationary unit of the indoor location system for localizing a mobile unit; and
        a power receiving unit including an ASi connector configured to mechanically connect the ultra-wideband transmission reception device to the power cable and to electrically connect the ultra-wideband transmission reception unit to the power line for powering the ultra-wideband transmission reception unit, wherein each ultra-wideband transmission reception device is connected to the power cable at a respective stationary position.

2. The network of claim 1, wherein the stationary positions form an infrastructure of the ultra-wideband transmission reception units in a garland arrangement to allow localization of the one or more mobile units of the indoor location system.

3. The network of claim 1, wherein the ASi connector includes a conductor electrically connected to the ultra-wideband transmission reception unit, and electrically contacting the power line.

4. The network of claim 3, wherein the power line of the power cable is embedded in an insulator and the ASi connector includes a conductor extending through the insulator for electrically contacting the power line.

5. The network of claim 1, wherein the power cable comprises an insulator, the power line of the power cable is embedded in the insulator and the ASi connector includes a conductor electrically connected to the ultra-wideband transmission reception unit, extends through the insulator, and electrically contacts the power line.

6. The network of claim 1, wherein the power cable comprises a sequence of pre-mounted connectors that are attached to the power cable and are electrically connected to the power line, at least a subgroup of the pre-mounted connectors electrically connecting the ultra-wideband transmission reception units with the power line.

7. The network of claim 1, further comprising a support structure, wherein the power cable is fixed to the support structure at a plurality of points such that the power cable passes along the stationary positions.

8. The network of claim 1, further comprising a support wire arrangement including a wire segment extending within the indoor environment, wherein the power cable is fixed to the wire segment at a plurality of points such that the power cable passes along the stationary positions.

9. The network of claim 1, wherein
    the power line of the power cable is embedded in an insulator;
    the power cable is configured as a profiled cable and includes two power lines; and
    the ASi connector of the power receiving unit comprises a pair of piercing needles enabling penetration of the insulator and displacing the power lines without cutting but contacting the power lines.

10. The network of claim 9, wherein the ASi connector includes the pair of piercing needles.

11. The network of claim 9, wherein each of the power lines comprises internal copper strands embedded in the insulator of the power cable.

12. The network of claim 1, wherein each ultra-wideband transmission reception unit comprises:
    a circuit board electronics with a radio pulse wave generator; and
    a receiver circuit configured to perform ultra-wideband radio transmission and reception for large bandwidth communication with a bandwidth of at least 500 MHz.

13. The network of claim 1, wherein each ultra-wideband transmission reception unit comprises:
    a circuit board electronics with a radio pulse wave generator; and
    a receiver circuit configured to perform ultra-wideband radio transmission and reception with one or more mobile units for large bandwidth communication with a bandwidth of at least 20% of a carrier frequency.

14. The network of claim 1, wherein each ultra-wideband transmission reception unit comprises:
    a circuit board electronics with a radio pulse wave generator; and
    a receiver circuit configured to perform ultra-wideband radio transmission and reception with one or more mobile units for large bandwidth communication in a frequency band of 3.1 GHz to 10.6 GHz.

15. The network of claim 1, wherein each ultra-wideband transmission reception unit comprises:
    a circuit board electronics with a radio pulse wave generator; and
    a receiver circuit configured to perform ultra-wideband radio transmission and reception with one or more mobile units for large bandwidth communication in a frequency band of 4 GHz or 8 GHz with an equivalent isotropically radiated power density of less than or equal to 41.3 dBm/MHz.

16. A system comprising:
a support structure or a support wire arrangement extending within an indoor environment above a floor of a hall; and
a positioning network comprising:
- a power source and a power supply system including a power cable configured as an actuator-sensor-interface (ASi) flat cable with a power line, wherein the power source is configured to supply a voltage to the power line of the power cable and wherein the power cable is arranged in a network configuration within the indoor environment; and
- a plurality of ultra-wideband transmission reception devices configured to communicate via ultra-wideband with one or more mobile units within range, each ultra-wideband transmission reception device comprising:
  - an ultra-wideband transmission reception unit configured to operate as a stationary unit of an indoor location system, and
  - a power receiving unit including an ASi connector configured to mechanically connect the ultra-wideband transmission reception device to the power cable and to electrically connect the ultra-wideband transmission reception unit to the power line for powering the ultra-wideband transmission reception unit, wherein the power cable is fixed to the support structure or the support wire arrangement at a plurality of points and the plurality of transmission reception devices is connected to the power cable at respective stationary positions.

17. The system of claim 16, wherein the support structure comprises a support wide arrangement that includes a wire segment, the system further comprising a plurality of storage and/or work stations arranged along a plurality of aisles, wherein the wire segment extends along at least a portion of an aisle of the plurality of aisles.

18. The system of claim 17, wherein an installation height of the ultra-wideband transmission reception devices is higher than a height of the storage and/or work stations.

19. The system of claim 17, the storage and/or work stations comprise shelving structures and/or machine tools.

20. A method for installing a plurality of ultra-wideband transmission reception devices of an indoor location system in an indoor environment, each ultra-wideband transmission reception device including an ultra-wideband transmission reception unit operating as a stationary unit of the indoor location system and a power receiving unit powering the ultra-wideband transmission reception unit, the method comprising:
identifying stationary positions in the indoor environment for operating the plurality of ultra-wideband transmission reception devices to ensure communication via ultra-wideband with a mobile unit of the indoor location system in preselected localization areas within the indoor environment;
deriving a course of a power cable that includes power line, wherein the identified stationary positions are arranged along the course, the power cable being an actuator-sensor-interface (ASi) flat cable;
deploying the power cable along the course; and
fixing a respective one of the plurality of transmission reception devices at each stationary position by mechanically connecting an ASi connector of the respective power receiving unit to the power cable and electrically connecting the ultra-wideband transmission reception unit to the power line.

21. The method of claim 20, wherein the power line is embedded in an insulator and wherein electrically connecting the ultra-wideband transmission reception unit to the power line comprises piercing through the insulator.

22. The method of claim 20, further comprising:
installing a support wire arrangement that includes a wire segment within the indoor environment; and
fixing the power cable to the wire segment at a plurality of points such that the power cable passes along the stationary positions.

23. The method of claim 20, further comprising recording spatial positions of the plurality of transmission reception devices within the indoor environment to calibrate the indoor location system.

\* \* \* \* \*